Feb. 3, 1925.  M. NÜESCH  1,525,088

TIRE

Filed May 23, 1924

INVENTOR
Meinrad Nüesch.
BY
his ATTORNEY

Patented Feb. 3, 1925.

1,525,088

UNITED STATES PATENT OFFICE.

MEINRAD NÜESCH, OF THURSTON, NEBRASKA.

TIRE.

Application filed May 23, 1924. Serial No. 715,282.

*To all whom it may concern:*

Be it known that I, MEINRAD NÜESCH, a citizen of Switzerland, residing at Thurston, in the county of Thurston and State of Nebraska, have invented certain new and useful Improvements in Tires, of which the following is a specification.

This invention relates to improvements in vehicle wheels of the pneumatic type and has for its principal object to provide means for securing a vehicle tire, of the pneumatic or cushion type, circumjacent a wheel in a manner that can be readily disengaged and easily put on again.

Another purpose of this invention is to so secure a tire casing as to be rendered air tight, thereby disposing with the usual inflated inner tube.

These, and other objects, such as convenience, durability, effectiveness and low cost of manufacture are attained by the novel construction, combination and arrangement of parts, hereinafter described and shown in the accompanying drawing, forming a material part of this disclosure, and in which:—

Figure 1:
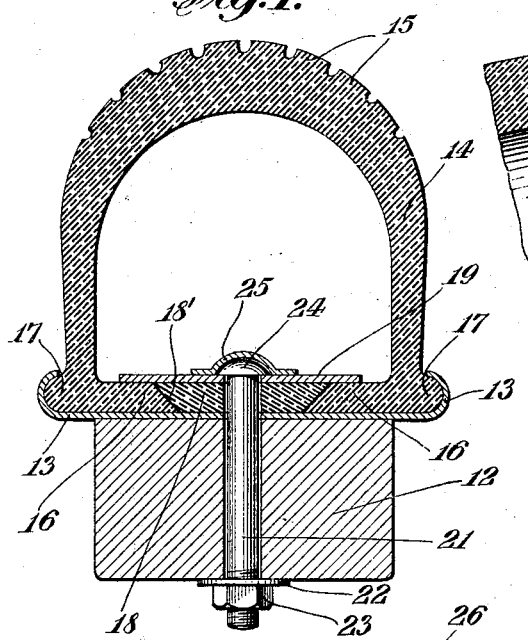
Figure 1 is a transverse sectional view of an embodiment of the invention, showing its application.
Figure 2:
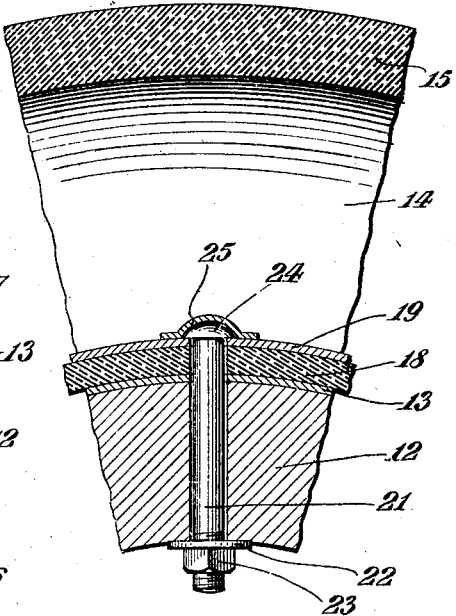
Figure 2 is a fragmentary longitudinal sectional view of the same.
Figure 3:
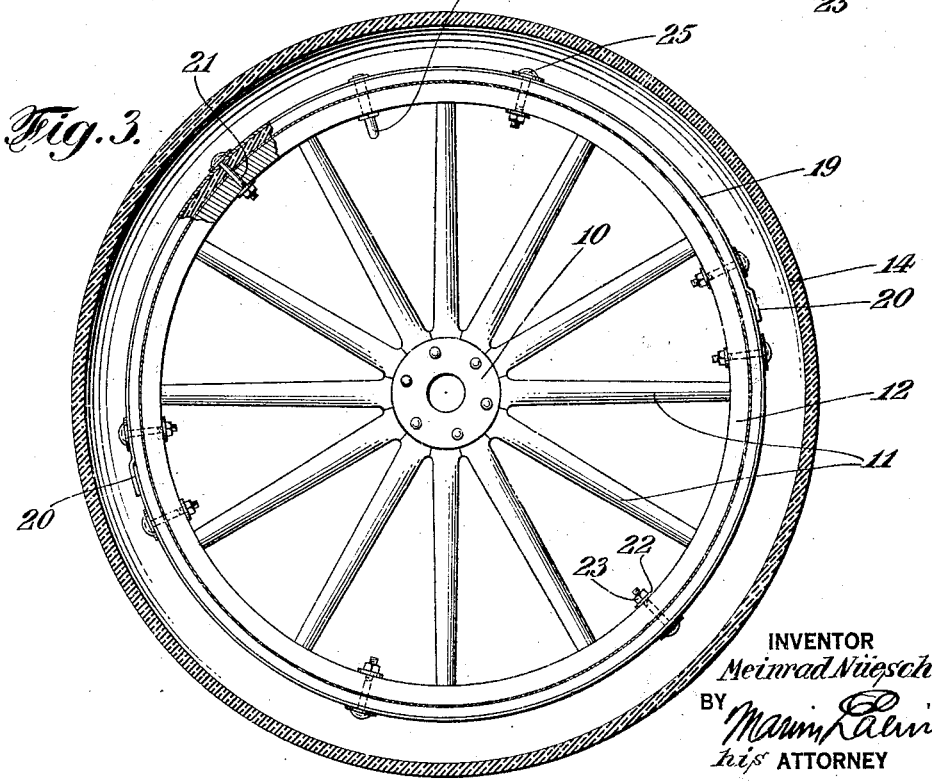
Figure 3 is a partial side elevational and sectional view, showing a wheel with the invention applied and drawn to a smaller scale.

Referring to the drawing in detail, the numeral 10 designates the hub of a vehicle wheel having the usual spokes 11, the same being fixed at their outer ends in a felly 12, circumjacent to which is a channeled rim 13.

A tire casing 14, having the usual tread 15, has convergingly bevelled inreaching bases 16 provided with outer beads 17 adapted to fit in the rim 13.

A rubber wedge-shaped strip 18 is disposed over the rim 13 and held rigid between the casing bases 16 by a metal band 19, circumjacent the rim 13 and having lap joints 20.

Passing through the metal band 19, the strip 18, rim 13, and the felly 12 are bolts 21 having washers 22 secured against the outer surface of the felly by nuts 23, these bolts 21 tending to firmly secure the wedge-shaped strip 18 between the metal band 19 and the rim 13, pressing against the bevelled edges 18' of the tire, forming air-tight joints and forcing the beads 17 against their seats in the rim 13.

The bolts 21 have button heads 24 over which are disposed caps 25 tightly secured to the metal band 19 by brazing or welding to prevent escape of air through the bolt openings.

Thus it will be seen that the casing 14 is disposed and secured in the rim 13 in a manner so as to render it completely airtight, being inflated by forcing air through a valve 26 of the usual type accessible at the inner side of the felly through which it extends.

From the foregoing it will be seen that a device has been disclosed which is simple to construct and effective in use, dispensing entirely with inner tubes and the troubles involved therewith.

Having thus described my invention, what I claim as new and desire to secure by Letters Patent, is:—

1. In a vehicle wheel having a channelled rim, a metal band having overlapping sections, a rubber tire casing having inreaching bevelled inner circumferential edges between said band and said rim, a wedge-shaped rubber strip between said inreaching edges and capped button headed bolts passing through said band and rim, securing said casing edges and said strip, said band forcing the edges of said strip into air-tight contact with the bevelled edges of said tire.

2. In a vehicle wheel having a channelled rim disposed over the felly of the wheel, said channelled rim having inwardly curved circumferential edges, a rubber tire casing having an annular chamber, beadings projecting outwardly from the base of said casing to engage in said channelled rim, inreaching elements on the base of said casing having spaced convergingly bevelled edges, a rubber band of wedge-shaped cross section tight-fitting the bevelled edges, a sectional metallic band disposed over said rubber band and the adjacent portions of the inreaching casing elements, concavo-convex caps having flanges united to said sectional band, bolts having heads engaged in said caps, said bolts passing through the bands and the felly of the wheel, and means for entering compressed air into the chamber in the tire casing.

In witness whereof I have signed this application.

MEINRAD NÜESCH